(No Model.)
W. P. BRODBECK.
BICYCLE ATTACHMENT.
No. 588,551. Patented Aug. 24, 1897.
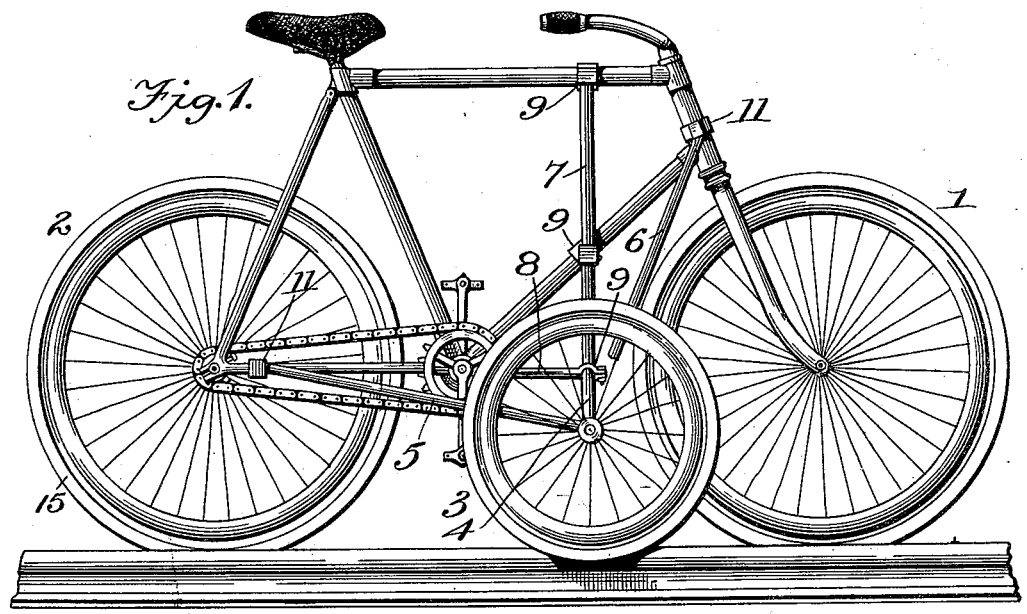
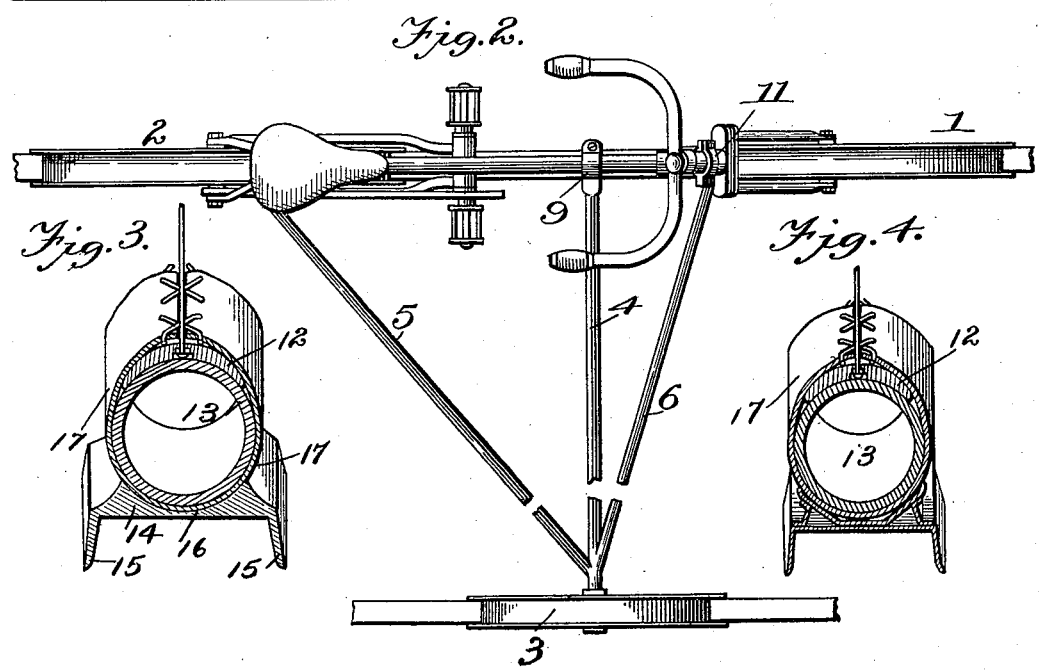
WITNESSES
Edwin G. McKee
J. C. Tappan
INVENTOR,
William Penn Brodbeck,
by John Wedderburn
Attorney

UNITED STATES PATENT OFFICE.

WILLIAM PEN BRODBECK, OF GALLATIN, MISSOURI.

BICYCLE ATTACHMENT.

SPECIFICATION forming part of Letters Patent No. 588,551, dated August 24, 1897.

Application filed September 23, 1896. Serial No. 606,730. (No model.)

*To all whom it may concern:*

Be it known that I, WILLIAM PEN BRODBECK, a citizen of the United States, residing at Gallatin, in the county of Daviess and State of Missouri, have invented certain new and useful Improvements in Bicycle Attachments; and I do hereby declare the following to be a full, clear, and exact description of the invention, such as will enable others skilled in the art to which it appertains to make and use the same.

This invention relates to a novel construction in a railroad-tricycle; and it consists in the features of construction hereinafter described and claimed.

In the accompanying drawings, forming a part of this specification, Figure 1 is a side elevation of a tricycle constructed in accordance with my invention. Fig. 2 is a top plan view of the same. Fig. 3 is a cross-section of a portion of a wheel, illustrating this invention. Fig. 4 is a similar view showing a modified construction.

In the said drawings, 1 indicates the forward wheel of the machine, 2 the driving-wheel, and 3 the side wheel.

The wheels 1 and 2 and the frame connecting the same I contemplate making as an ordinary bicycle, while the attachment by means of which the side wheel is secured thereto is removable, so that the machine can be used as an ordinary bicycle or as a tricycle. This attachment consists of a lateral arm 4, the front and rear braces 5 and 6, and an upright post 7. The lateral arm 4 is rigidly secured to the lower end portion of the post 7, while this post 7 is adapted to be secured to the frame of the bicycle and to a projection 8, extending from the hub of the pedal-shaft, by removable clamps 9, as shown.

The brace rods 5 and 6 are rigidly secured at their outer ends to the outer end portions of the lateral arm 4, while at their inner ends they are provided with clamps 11 to be fastened upon the steering-post and rear end portion of the frame of a machine. In this way it will be seen that I provide an attachment for an ordinary bicycle by means of which it can be changed into a tricycle, as shown. The construction is light, simple, and inexpensive and can be readily applied and removed.

I have also shown a novel construction in a wheel, which is adapted to be used in connection with the tricycle when the same is employed as a railroad-tricycle. In the drawings, 12 is the rim, and 13 the tire, of an ordinary bicycle-wheel. This improvement consists of a flanged tire 14, adapted to fit upon and be secured to the wheel. This flanged tire has an annular seat to receive the rubber tire of the bicycle, and on the outer edges of this attachment are the flanges 15 to embrace the sides of the rail. This flanged tire in cross-section approximates the cross-section of the rail, so that it fits snugly thereon. For the purpose of attaching this flanged tire to the bicycle-wheel there are secured to the main portion of the tire, adjacent to the seat 16 therein, belting or straps 17, which extend partly around the tire and are provided near their inner edges with eyelets to receive the lacing-strings, so that the inner edges of these straps 17 may be laced together to firmly hold the flanged tire upon the bicycle-wheel.

It will be readily seen from the foregoing description that a tire made in this manner provides a convenient arrangement to give the wheels of a tricycle a firm bearing upon the rails of a railroad-track, since the flanges 5 of the attachment serve to guide and steady the wheel. It will be further noted that this attachment can be removed by unlacing, so that the bicycle can be used in the ordinary manner. It will be understood, of course, that this is only one mode of attaching this flanged tire to the wheel, and it is especially desirable from the fact that the flanged tire can be removed, and therefore it will be understood that in another case the flanged tire can be glued or otherwise permanently secured upon the wheel.

In Fig. 4 I have shown this flanged tire as made of sheet metal, whereas in Fig. 3 it is shown as solid in cross-section, and in that case would be preferably made of hard rubber or other material; but in Fig. 4 the different parts are constructed of sheet metal suitably braced, as shown, and retaining the same general characteristics of the device shown in Fig. 3.

Having thus described my invention, what I claim as new, and desire to secure by Letters Patent, is—

1. The combination with the frame of a bicycle, of an attachment consisting of an upright post removably secured to the frame of the bicycle, a lateral arm 4 secured to said post and provided at its free end with a wheel, and brace-rods 5 and 6 secured at their outer ends to the outer end portions of said arm and removably secured at their inner ends to the frame of the bicycle, substantially as described.

2. A flanged wheel-tire consisting of a circular body portion having an interior curved seat to fit upon a curved tire or rim, outwardly-extending exterior flanges at the side edges of said body portion, a smooth and even tread between said flanges, and lacing devices secured to the interior of said tire adjacent to the seat thereof.

In testimony whereof I have signed this specification in the presence of two subscribing witnesses.

WILLIAM PEN BRODBECK.

Witnesses:
J. P. O. GIVENS,
J. L. NETHERTON.